…

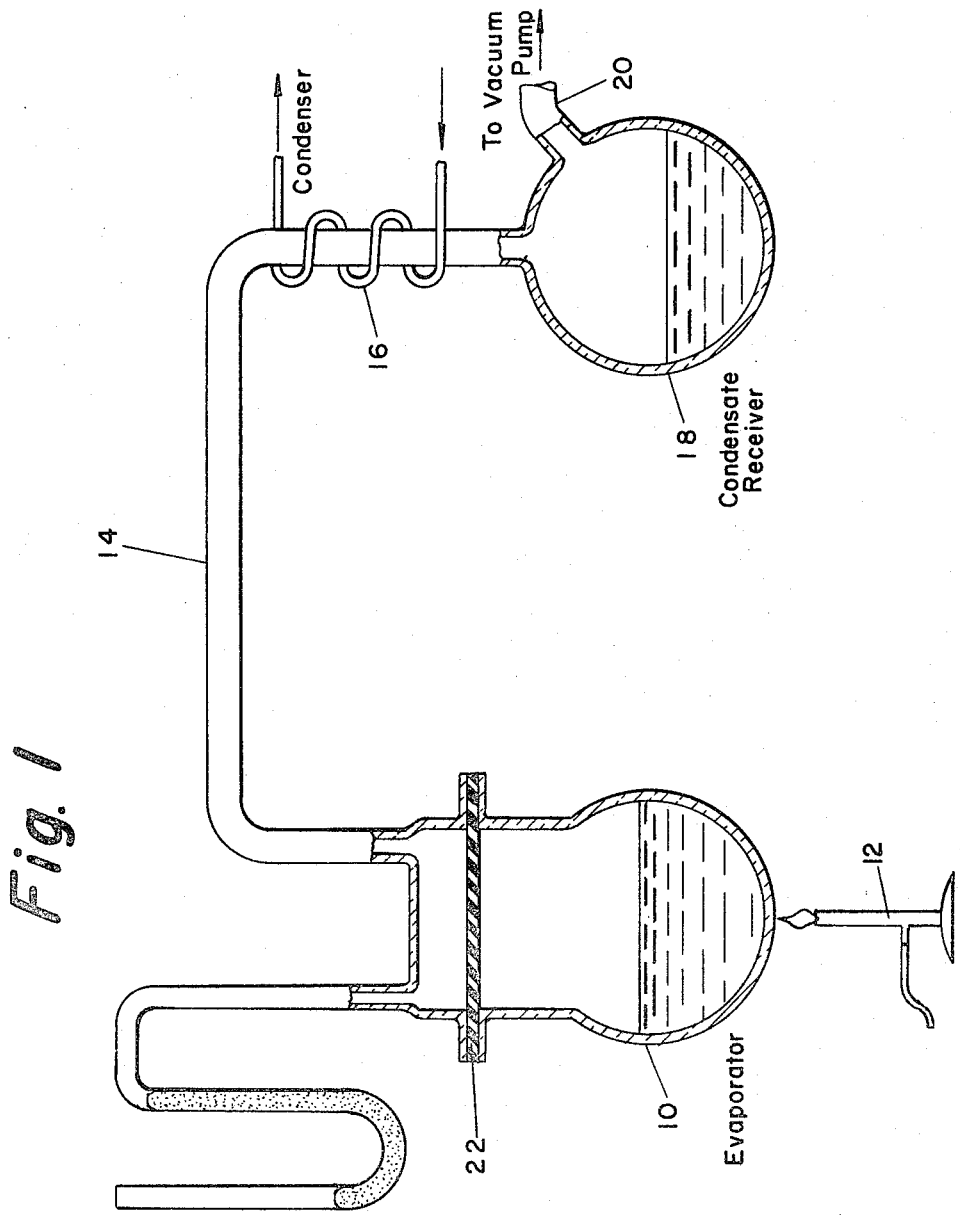

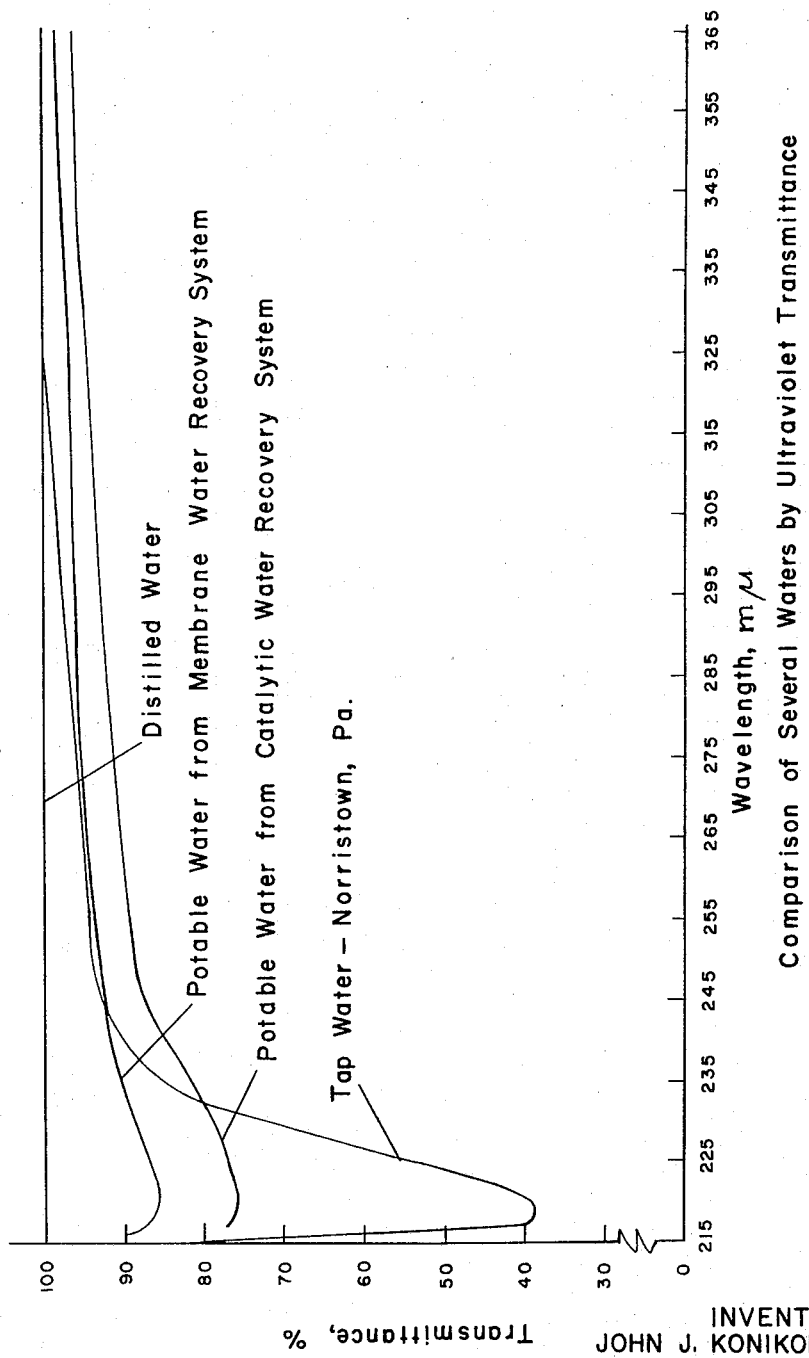

United States Patent Office 3,303,105
Patented Feb. 7, 1967

3,303,105
DIFFUSION OF WATER VAPOR THROUGH
SILICONE RUBBER
John J. Konikoff, Laverock, Allen H. Okamoto, Ambler, and Luther Reynolds, Philadelphia, Pa., assignors to General Electric Company, a corporation of New York
Filed Mar. 25, 1963, Ser. No. 267,479
1 Claim. (Cl. 203—11)

The invention relates to an improved method and apparatus for extracting potable water from water containing materials.

The term "water containing materials" is used herein to include natural biological wastes such as urine, fecal matter, perspiration and respiration products, as well as wash water and saline water. "Potable water" as used here connotes both lack of toxicity and lack of offensive taste, color and odor.

The advent of long manned space flights has presented many new problems, among which is the provision of a potable water supply. Flights extending for months and possibly years are now being planned, and it is recognized that it is impractical to store sufficient quantities of water because of the weight involved. Hence, it becomes important to find sources of water that may, after suitable treatment, be used for drinking purposes.

Urine, because it contains about 92% water, becomes of immediate interest as a primary source of water. The text book, "Practical Physiological Chemistry," by Hawk, Oser and Summerson, 13th Edition, published by Blakiston Company, Inc., New York, N.Y. (1954), lists dozens of constituents of urine, many of which occur only in the abnormal state. Most of these are organic and are present only in minute amounts. It is to be expected that some of even the most toxic of these, if present in the blood stream, would be detoxified when orally ingested. Yet in view of the lack of complete knowledge of body retention of these products—or the original constituent itself—it seems better to try to eliminate the question of potential toxicity by eliminating the substance.

Table I below lists the composition of a typical normal urine:

TABLE I

COMPOSITION OF A TYPICAL NORMAL URINE
(By weight in grams)

| | |
|---|---:|
| Water | 1200.0 |
| Solids | 60.0 |
| Urea | 30.0 |
| Uric acid | 0.7 |
| Hippuric acid | 0.7 |
| Creatinine | 1.2 |
| Indican | 0.01 |
| Oxalic acid | 0.02 |
| Allantoin | 0.04 |
| Amino acid nitrogen | 0.2 |
| Purine bases | 0.01 |
| Phenols | 0.2 |
| Chloride as NaCl | 12.0 |
| Sodium | 4.0 |
| Potassium | 2.0 |
| Calcium | 0.2 |
| Magnesium | 0.15 |
| Sulfur, total, as S | 1.0 |
| Inorganic sulfates as S | 0.8 |
| Neutral sulfur as S | 0.12 |
| Conjugated sulfates as S | 0.08 |
| Phosphate as P | 1.1 |
| Ammonia | 0.7 |

Fundamentally, there are both non-volatile and volatile materials contained in urine that require treatment for their elimination. The former are characterized by the salts, primarily sodium chloride, and by urea and pigments, and the latter principally by ammonia and phenols. Many of these materials are toxic to various degrees and, as such, should be eliminated. Unfortunately, no single method is known that will extract both types. Distillation alone is an ineffectual means for obtaining potable water from urine. Other experimenters have tried distillation both at atmospheric and reduced pressures. In general, the material produced was odorous, alkaline and contained many materials that made it unfit for human consumption. Further treatment, such as chlorination, ion exchange, or filtration improved the quality. A severe weight penalty would be incurred if the filter technique or the ion exchange process was relied upon. Use of chlorine alone was suitable only for destroying the pathogens that may exist. The odor, and, in some cases, the color remained.

A more recent development is described in United States Patent No. 3,127,243, filed August 15, 1960. A method is proposed there which subjects urine and fece vapors to treatment by a heated catalyst. The water recovered in this system is potable and of a high degree of purity. Heating the catalyst, while not requiring an inordinate amount of energy, nevertheless does involve the use of some energy which it would be desirable to put to other uses.

It is, therefore, an object of this invention to provide a method and apparatus to produce potable water from water containing materials which will not require the use of a heated catalyst.

It is also an object of this invention to provide such a method and apparatus which will not require the addition of chemicals and so will have a long life span.

In carrying out the invention in one form, the water containing materials are heated in an evaporator under a partial vacuum. A selectively permeable membrane is used to separate the evaporator from a condenser in which water vapors are condensed to potable water. The selectively permeable membrane permits water vapors to pass, while preventing or retarding the passage of contaminating materials.

The invention will be more clearly understood from the description which follows and from the drawings in which:

FIGURE 1 is a schematic of a water recovery apparatus in accordance with this invention; and FIGURE 2 is a comparison of several waters by ultraviolet transmittance.

Referring to FIGURE 1, the water containing material is placed in container 10 which functions as an evaporator. A suitable source of heat, such as Bunsen burner 12 supplies the heat needed to cause the water in the water containing material to evaporate. The water vapor produced in evaporator 10 is conveyed by tube 14 to condenser 16 which changes it to its liquid form for collection in condensate receiver 18. Condensate receiver 18 is connected to a vacuum pump (not shown) by tube 20. Thus, the entire system is at a low pressure, for example, 40–50 millimeters (mm.) of mercury.

In accordance with this invention, positioned above the water containing material in evaporator 10 is selectively permeable membrane 22. It should be noted that condenser 16 need not be physically removed from selectively permeable membrane 22 as shown in FIGURE 1. For example, tube 14 can be eliminated by positioning condenser 16 in the space above membrane 22. Such a membrane has different permeabilities for different gases. The permeability ($Pr$) of a membrane to a particular gas is measured in the following units:

$$\frac{(cm.^3 \text{ gas})(cm. \text{ thickness of membrane})}{(sec.)(cm.^2 \text{ membrane area})(cm. \text{ Hg pressure across membrane})}$$

which can be more conveniently written as:

$$(cm.^3 \text{ gas})(cm. \text{ thick})/(sec.)(cm.^2)(cm. \text{ Hg}\Delta P)$$

This varying permeability characteristic is illustrated by Table II below:

TABLE II.—PERMEABILITY RATES OF VARIOUS GASES IN DIMETHYL SILICONE RUBBER

| Gas: | Permeability ($Pr$) $(cm.^3 \text{ gas})(cm. \text{ thick})/(sec.)(cm.^2) cm. \text{ Hg}\Delta P$ |
|---|---|
| $N_2$ | $28 \times 10^{-9}$ |
| He | $37 \times 10^{-9}$ |
| $O_2$ | $60 \times 10^{-9}$ |
| $H_2$ | $70 \times 10^{-9}$ |
| $CH_4$ | $100 \times 10^{-9}$ |
| $CO_2$ | $325 \times 10^{-9}$ |
| $NH_3$ | $600 \times 10^{-9}$ |
| $H_2O$ | $3800 \times 10^{-9}$ |

It should be noted that the rate for $H_2O$ far exceeds the rates for the other listed gases. The permeability of $H_2O$ is more than six times that of ammonia, the next highest gas. The water in the water containing material consequently permeates through the membrane more rapidly than the other constituents.

The composition of the liquid collected is indicated in Table III in comparison with other water samples. The column headed "Catalytic" represents the constituents of the water obtained by the method described in the previously referred to patent.

TABLE III.—COMPARISON OF POTABLE WATER

| | City Phila., 1959 (Avg.) | Norristown Water Co. (Avg.) | Catalytic | Membrane |
|---|---|---|---|---|
| Turbidity | 0.0 | 0 | 0 | 0 |
| Color | 2 | 0 | 0 | 0 |
| Total Solids | 243 | 227 | (¹) | (¹) |
| Total Org. and Amm. (N) | 0.18 | 0 | 0.1 | 2.5 |
| Nitrite (N) | 0.000 | 0.003 | 0.05 | 0.0 |
| Nitrate (N) | 1.26 | 1.5 | 0 | 0 |
| pH | 6.6 | 8.0 | 6.8 | 8.6 |
| Alkalinity | 35 | 39 | 2 | 14 |
| Sulfates ($SO_3$) | 70 | 82 | 0.4 | 0.4 |
| Chloride (Cl) | 18 | 13 | 0.5 | 0.5 |
| Total Hardness | 143 | 150 | 2 | (¹) |
| Iron (Fe) | 0.06 | .01 | (¹) | (¹) |
| Chloride Residue Total | 0.77 | (¹) | (¹) | (¹) |
| Chloride Residue Free | 0.64 | (¹) | (¹) | (¹) |
| Odor | (¹) | 0 | 0 | 0 |
| Carbon Dioxide as $CO_2$ | (¹) | 1.7 | 3 | 0 |
| Phenol | (¹) | (¹) | 0 | 0 |

¹ Not analyzed for quantity.

The water obtained by the instant apparatus is shown by this table to compare favorably with the water available from city supplies.

A further demonstration of the feasibility of the instant apparatus is given in FIGURE 2. Distilled water is compared in FIGURE 2 with other waters, including that produced by an apparatus constructe din accordance with this invention. A point on these curves of less than 100 percent transmittance indicates the presence in the water of some type of impurity. It is evident that water produced by the apparatus of this invention, as well as that by the catalytic system (United States Patent No. 3,127,243, filed August 15, 1960), compares favorably with the tap water sample.

The varying permeability of membranes is not a newly discovered phenomenon. For example, Karl Kammermeyer in United States Patent 2,966,235 has disclosed the greater permeability a silicone rubber membrane has to carbon dioxide as compared with oxygen, helium, nitrogen and hydrogen.

The membranes exhibiting this selective permeability characteristic are non-porous and include a variety of materials. Since permeability to water vapor was the primary interest in the instant work, a variety of materials were tested to determine the rates for this gas. Table IV lists the results of this test.

TABLE IV.—WATER VAPOR PERMEATION RATES
(Room temperature)

| Film: | Permeability ($Pr$) (gms. $H_2O$ (cm. thick)/(sec.) $(cm.^2)$ (cm. $Hg\Delta P$) |
|---|---|
| Vinylidene chloride-acrylonitrile | $0.015 \times 10^{-10}$ |
| Nitrocellulose-wax coated cellophane | $0.02 \times 10^{-10}$ |
| Rubber hydrochloride | $0.05 \times 10^{-10}$ |
| Nylon | $0.32 – 0.63 \times 10^{-10}$ |
| Vinylidene | $0.93 \times 10^{-10}$ |
| Lexan | $1.0 \times 10^{-10}$ |
| Polyvinyl butyral | $1.5 \times 10^{-10}$ |
| Polyethylene terephthalate | $2.59 \times 10^{-10}$ |
| Polytetrafluoroethylene | $2.94 \times 10^{-10}$ |
| Polyethylene | $0.05 – 4.85 \times 10^{-10}$ |
| Cellulose acetate | $8.85 – 19.4 \times 10^{-10}$ |
| Regenerated cellulose | $12.5 – 20.0 \times 10^{-10}$ |
| Ethyl cellulose | $21.5 \times 10^{-10}$ |
| Polyvinyl alcohol | $0.04 – 40.0 \times 10^{-10}$ |
| Silicone rubber | $15.5 – 51.8 \times 10^{-10}$ |

It is evident that polyvinyl alcohol, ethyl cellulose, cellulose, acetate, as well as the silicone rubbers, have relatively high permeabilities. Silicone rubbers have the additional advantages of high temperature strength and stability as well as being more difficult to hydrolyze. These factors make silicone rubber membranes particularly suitable for use in the present invention.

The particular membrane utilized in most of the work discussed here was General Electric Company No. SE 555, dimethyl silicone rubber.

In one test urine was used as the water containing material. Two thicknesses of dimethyl silicone rubber membrane 3 inches in diameter and approximately 1 to 2 mils (0.001 to 0.002 inch) thick separated this material in the evaporator from the condenser. A system pressure of 40 mm. Hg absolute was maintained with sufficient heat applied to the water containing material to effect a change of state in the water. Potable water was produced at a rate of 190 milliliters per hour.

While a particular embodiment of a water recovery system has been shown and described, it will be obvious that changes and modifications can be made without departing from the spirit of the invention and the scope of the appended claim.

What is claimed as new and desired to be secured by Letters Patent of the United States is:

The method of extracting potable water from water-containing natural biological wastes from the group consisting of urine, fecal matter, perspiration and respiration products, which comprises the steps of
- heating the said wastes in a heating zone to vaporize the water and form water vapor,
- diffusing the water vapor through a silicone rubber membrane and
- condensing the water vapor diffused through the membrane in a condensing zone while maintaining the pressure below atmospheric pressure in the heating and condensing zones.

References Cited by the Examiner

UNITED STATES PATENTS

| | | | |
|---|---|---|---|
| 2,159,434 | 5/1939 | Frey | 210—23 X |
| 2,223,586 | 12/1940 | Thomas | 55—158 |
| 2,433,741 | 12/1947 | Crawford | 55—16 |
| 2,862,575 | 12/1958 | Birdwhistell et al. | 55—16 |
| 2,966,235 | 12/1960 | Kammermeyer | 55—16 |
| 3,129,145 | 4/1964 | Hassler. | |
| 3,129,146 | 4/1964 | Hassler | 203—10 |
| 3,182,043 | 5/1965 | Kirkland | 260—542 |

FOREIGN PATENTS 731,390 5/1932 France.

OTHER REFERENCES

"Saline Water Conversion," Symposium U.S. Dept. of Interior (1957), pages 150, 151, and 152.

NORMAN YUDKOFF, *Primary Examiner.*

F. E. DRUMMOND, *Assistant Examiner.*